F. KOCH & R. BRASS.
Elongated-Spool for Holding Braid, Thread, &c.
No. 159,333. Patented Feb. 2, 1875.
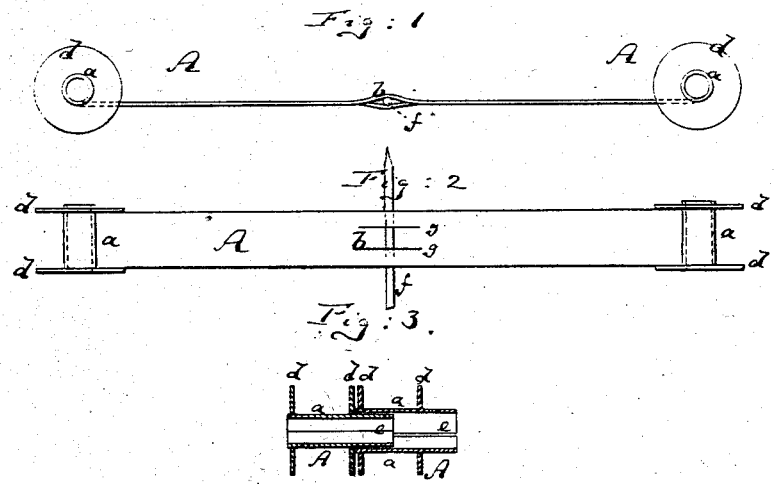
Witnesses:
A. Moraga
E. C. Webb
Inventors:
F. Koch
R. Brass
by their attorney
A. v. Briesen

UNITED STATES PATENT OFFICE.

FRIEDRICH KOCH AND ROBERT BRASS, OF WILLIAMSBURG, NEW YORK.

IMPROVEMENT IN ELONGATED SPOOLS FOR HOLDING BRAID, THREAD, &c.

Specification forming part of Letters Patent No. 159,333, dated February 2, 1875; application filed December 22, 1874.

*To all whom it may concern:*

Be it known that we, FRIEDRICH KOCH and ROBERT BRASS, both of Williamsburg, in the county of Kings and State of New York, have invented a new and Improved Elongated Spool for Holding Braid, Thread, &c., of which the following is a specification:

Figure 1 is a side view, and Fig. 2 a top view, of our improved elongated spool. Fig. 3 is a cross-section through the end of two connected spools.

Similar letters of reference indicate corresponding parts in all the figures.

This invention has for its object to produce a spool on which a greater length of braid or thread can be seen at one glance than on a common round spool, and which will nevertheless possess all and even increased advantages over said common round spool.

Our invention consists in forming a spool of two parallel flanged cylinders that are connected by a stiff strap or band, as hereinafter more fully described.

In the drawing, the letter A represents our improved elongated spool. The same is made of paper, pasteboard, or other suitable material, and consists of two cylinders, $a\ a$, that are held apart and connected by a stiff band or strap, $b$, of similar material. The cylinders $a\ a$ have flanges $d\ d$, to prevent the braid or thread from slipping off.

In use, the braid or thread is wound around the whole length of the double spool, so that considerable lengths thereof will be between the two cylinders $a$, thereby facilitating inspection and displaying the braid or thread to better advantage. The cylinders $a$, in offering rounded surfaces, will not cut or injure the braid or thread. By forming little cylindrical projections $e\ e$ on the cylinders $a$, beyond one of the flanges, $d$, we may be enabled to connect a series of our improved elongated spools side by side, as is indicated in Fig. 3, for the purpose of displaying in close proximity various styles or colors of braids or threads, or for other suitable purpose. Instead of forming the cylindrical projections $e$ on the end tubes, $a\ a$, separate tubes of smaller diameter may be used for connecting a series of these spools side by side, or connection may be established by other suitable means. The flanges $d$, instead of being on the cylinders $a$, may be applied with substantially the same effect to the connecting-band $b$—i. e., for preventing the thread, braid, or other matter from dropping off the spool. In the middle of the band $b$ are, or may be, two or more longitudinal incisions, $g\ g$, which admit of the introduction of a central pivot, $f$, as indicated in Figs. 1 and 2. Around this pivot the spool may be revolved in unwinding the thread, and also in winding it upon the spool. The incisions $g$ permit the elongated spool to be used on a sewing-machine, like a common spool, by putting it upon a fixed spool-holder, whereas heretofore long cards with thread or braid on them could not be thus put upon a central pivot and automatically unwound by the operation of the sewing-machine.

It will be observed, by reference to Figs. 1 and 2, that the band $b$ is so placed between the spools $a\ a$ that its cross-section is parallel to their axes, so that thus the faces of the band will be entirely covered and concealed by the thread or yarn wound upon the spools. This is an important feature, as it permits the convenient examination of the thread, &c., by hand as well as by the eye.

We claim as our invention—

1. The elongated spool A, composed of the cylinders $a\ a$, and of the connecting-band $b$ and flanges $d$, the cross-section of the band $b$ being parallel to the axes and between the flanges of said cylinders, substantially as and for the purpose specified.

2. In combination with the two cylinders $a\ a$ of an elongated spool, the cylindrical projections $e\ e$, applied to permit the junction of two or more elongated spools, substantially as specified.

3. In combination with the cylinders $a\ a$, constructed as described, the connecting-band $b$, provided with the incision $g$ in its center, for the reception of a suitable support, as and for the purpose specified.

FRIEDRICH KOCH.
ROBERT BRASS.

Witnesses:
F. V. BRIESEN,
E. C. WEBB.